(12) United States Patent
Horman et al.

(10) Patent No.: US 8,954,697 B2
(45) Date of Patent: Feb. 10, 2015

(54) ACCESS TO SHARED MEMORY SEGMENTS BY MULTIPLE APPLICATION PROCESSES

(75) Inventors: Neil R. T. Horman, Cary, NC (US); Eric L. Paris, Raleigh, NC (US); Jeffrey T. Layton, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 946 days.

(21) Appl. No.: 12/850,865

(22) Filed: Aug. 5, 2010

(65) Prior Publication Data

US 2012/0036334 A1 Feb. 9, 2012

(51) Int. Cl.
*G06F 12/02* (2006.01)
*G06F 12/10* (2006.01)
*G06F 13/16* (2006.01)
*G06F 9/52* (2006.01)
*G06F 9/54* (2006.01)

(52) U.S. Cl.
CPC .......... *G06F 12/109* (2013.01); *G06F 12/1009* (2013.01); *G06F 13/1663* (2013.01); *G06F 9/544* (2013.01); *G06F 2212/656* (2013.01); *G06F 9/52* (2013.01)
USPC ........... 711/165; 711/154; 711/161; 711/162; 711/170; 711/205; 711/206; 711/207; 711/208; 711/209; 718/1

(58) Field of Classification Search
USPC ......... 711/154, 161, 162, 165, 170, 205–209; 718/1
See application file for complete search history.

(56) References Cited

U.S. PATENT DOCUMENTS

| | | | |
|---|---|---|---|
| 2005/0097298 A1* | 5/2005 | Cohen | 711/206 |
| 2008/0140971 A1* | 6/2008 | Dankel et al. | 711/163 |
| 2009/0006714 A1* | 1/2009 | Durham et al. | 711/6 |
| 2009/0254724 A1* | 10/2009 | Vertes et al. | 711/162 |
| 2010/0161976 A1* | 6/2010 | Bacher | 713/164 |

* cited by examiner

*Primary Examiner* — Arpan P. Savla
(74) *Attorney, Agent, or Firm* — Lowenstein Sandler LLP

(57) ABSTRACT

A system configures page tables to cause an operating system to copy original page data in a data store when any one of the application processes makes a first write request for the original page data. The system detects a page fault from a memory management unit receiving a first write request from one of the application processes and creates the copy in physical memory to allow the application process to modify the page data copy. The other application processes have read access to the original page data. The system replaces the original page data in the data store with the page data copy in response to receiving a first synchronization request from the application process and updates a page table for one of the other application processes to configure access to the replaced page data in response to receiving a second synchronization request from the one other application process.

11 Claims, 15 Drawing Sheets

ACCESS TO SHARED MEMORY SEGMENTS BY MULTIPLE APPLICATION PROCESSES

TECHNICAL FIELD

Embodiments of the present invention relate to accessing shared memory. Specifically, the embodiments of the present invention relate to improving access to shared memory segments by multiple application processes.

BACKGROUND

Multiple processes from different applications and/or from the same application can share access to memory (e.g., RAM). For example, a parent process of an application can perform a clone system call or a fork system call to create a new process, also known as a child process of the parent process. The parent and child processes can share access to the same data in memory and can use a copy-on-write mechanism to allow each process to write to its own copy of the data. However, a parent process cannot first hide its modifications to data from the child process and then make its modifications visible to the child process.

Furthermore, processes from different applications that share access to the same data in memory have traditionally implemented memory locking mechanisms to enable mutual-exclusion between the different applications. Conventional memory locking mechanisms enable more than one application to read the same data, but these applications experience a delay when accessing the shared data while another application is modifying the data. Such delays, especially in environments where shared memory is under intensive read and write workloads from multiple application processes, can result in poor access time to the shared memory.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for accessing shared memory. A system configures page tables for a plurality of application processes to cause an operating system to create a copy of original page data stored in a data store when any one of the application processes makes a first write request for the original page data. The system detects a page fault in response to a memory management unit receiving a first write request from one of the application processes and creates a copy of the original page data in physical memory in response to the page fault to allow the application process to modify the page data copy. The other application processes have read access to the original page data. The system replaces the original page data in the data store with the page data copy in response to receiving a first synchronization request from the application process and updates a page table for one of the other application processes to configure access to the replaced page data in response to receiving a second synchronization request from the one other application process.

Two or more processes from different applications and/or the same application can share access to memory (e.g., RAM). For example a parent process and a child process from the same application can share access to the same data in memory. However, a parent process cannot first hide its modifications to data from the child process and then make its modifications visible to the child process. Furthermore, traditional memory locking mechanisms have been implemented to enable mutual-exclusion between processes from different applications that share memory such that when one of the application processes is reading data, the other application processes can also read the same data. These locking mechanisms, however, cause an application process to experience a delay when accessing the shared data while another application process is modifying it.

Embodiments of the present invention utilize application enable processes from different applications and/or different processes of the same application to transparently migrate data between a shared state and a private state using a copy-on-write mechanism and system function calls (e.g., msync system call), and to minimize latency experienced by processes from different applications and/or different processes of the same application.

Figure 1:
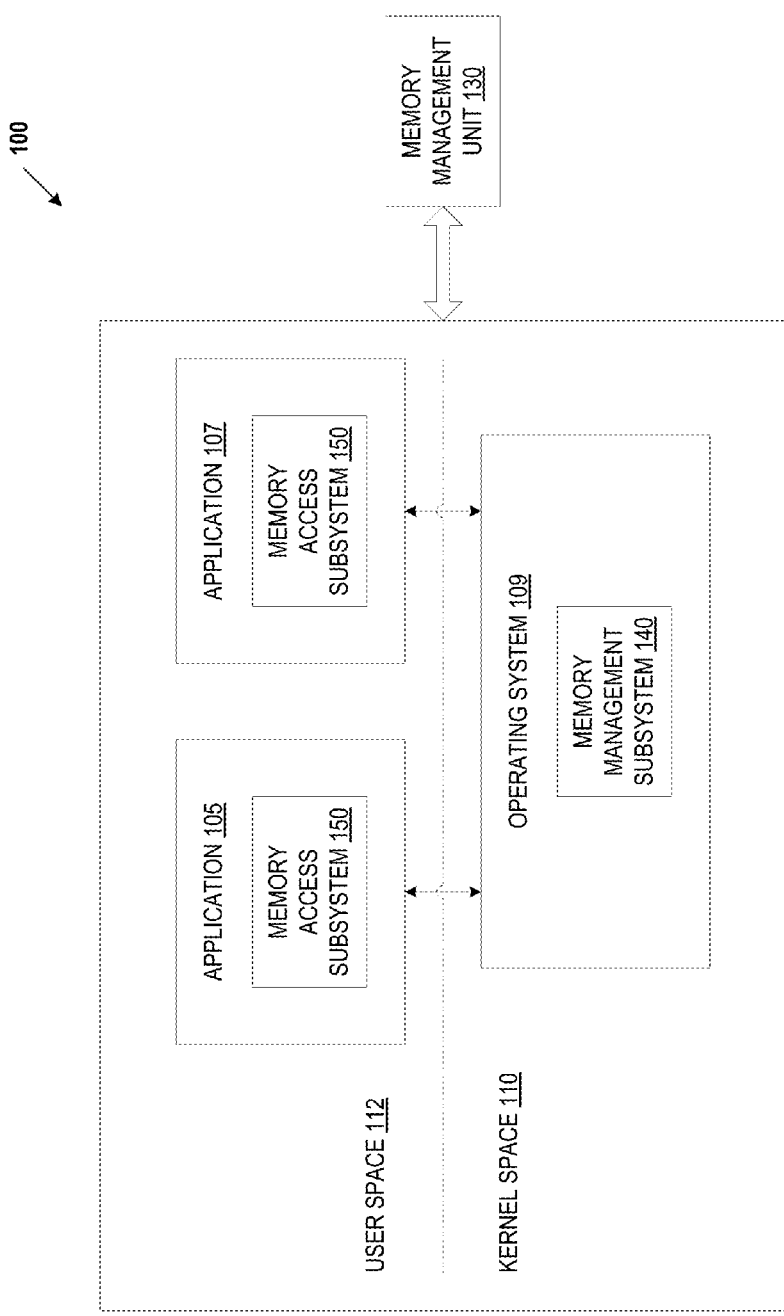
FIG. 1 illustrates an exemplary shared memory system in which embodiments of the present invention may operate.

FIG. 1 is a block diagram of one embodiment of a shared memory system 100 that may be part of a computing system such as a client computer (e.g., a personal computer, a laptop, a PDA, a mobile phone, etc), a server computer, a gateway computer, etc. An exemplary computer system is described in greater detail below in conjunction with FIG. 8.

System 100 includes physical memory (main memory), such as volatile memory (e.g., random access memory (RAM)). The physical memory is memory that is actually present in a system and has a physical address. Virtual memory is a virtual address space having virtual addresses. With a virtual address space, the system 100 can identify areas of RAM that have not been used recently and copy them onto a hard disk. Virtual memory can free up space in RAM to load new applications into the RAM and can emulate an unlimited RAM space even though a system 100 may have limited physical memory installed.

The physical memory is mapped to virtual memory, which can be divided into regions, such as user space 112 and kernel space 110. The kernel space 110 is reserved for running an operating system 109 (e.g., Linux® OS, Windows® OS, etc.). The user space 112 is reserved for user mode applications including user applications 105 and 107. An application 105, 107 can be any type of application including, for example, a database management application, a browser application, a web application, a desktop application, etc. An application 105,107 is a set of instructions that can be executed by one or more processors. An application process is an instance of an application that is being executed.

A virtual address space is divided into equal-size pieces called pages. The physical address space is divided into equal-sized pieces called page frames. System 100 includes memory management hardware, known in the art as a memory management unit (MMU) 130, to implement the mapping and translation of the pages to the physical page frames. The MMU 130 is a hardware device or circuit that translates a virtual address for a page into a physical address for a page frame in the physical memory (e.g., RAM). In one embodiment, system 100 includes a processor with an integral MMU 130. In other embodiments, the MMU 130 is a separate chip.

The kernel space 110 and user space 112 work with virtual addresses that are mapped to page frame addresses by the MMU 130. The mapping is defined by and stored in one or more data structures, such as a page table which is set up by the operating system 109. In addition to using page tables, an operating system 109, such as Linux® OS, can also use lists, such as virtual memory-area structures (vm-area structures), to represent a virtual address space. The operating system 109 can create and maintain a page table for an application process. The operating system 109 can create one page table per application process and can store the page tables in the user space 112. When an application 105,107 process makes a request for access to a page at a particular virtual address, the request is sent to the MMU 130, which uses the page table to attempt to translate the virtual address into a corresponding physical address.

Multiple processes from different applications and/or the same application can share access to memory, such as a parent process and a child process from the same application sharing access to the same data in memory. Traditionally, the parent and child processes can use a copy-on-write mechanism to allow each process to write to its own copy of the data. The child process inherits the same mapping parameters for the parent process. A parent process can have a mapping parameter set to make any modifications made by the parent process visible to the child process, such as setting the mapping parameter to MAP_SHARED. Alternatively, the parent process can have a mapping parameter set to make any modifications made by the parent process only visible to the parent process and hidden from the child process, such as setting the mapping parameter to MAP_PRIVATE. However, a parent process can only specify either MAP_SHARED or MAP_PRIVATE, but not both. Thus, a parent process cannot first hide its modifications to data from the child process and then make its modifications visible to the child process.

Furthermore, processes from different applications that share access to the same data in memory have traditionally implemented memory locking mechanisms to enable mutual-exclusion between the different applications. Conventional memory locking mechanisms, however, cause the different applications to experience delays in accessing the shared memory when one application is modifying the shared data.

Embodiments of the invention provide a mechanism for minimizing the above latency and for processes from different applications and/or different processes of the same application to transparently migrate data between a shared state and a private state using a copy-on-write mechanism and system function calls (e.g., msync system call).

In particular, an application 105,107 includes a memory access subsystem 150 coupled to the MMU 130, and an operating system 109 includes a memory management subsystem 140 coupled to the MMU 130 to utilize the application process page tables to enable processes from different applications and/or different processes of the same application to minimize latency experienced by application processes, and to modify a private copy of a page and to use a system call, such as msync, to share the modified data with other application processes.

Figure 2:
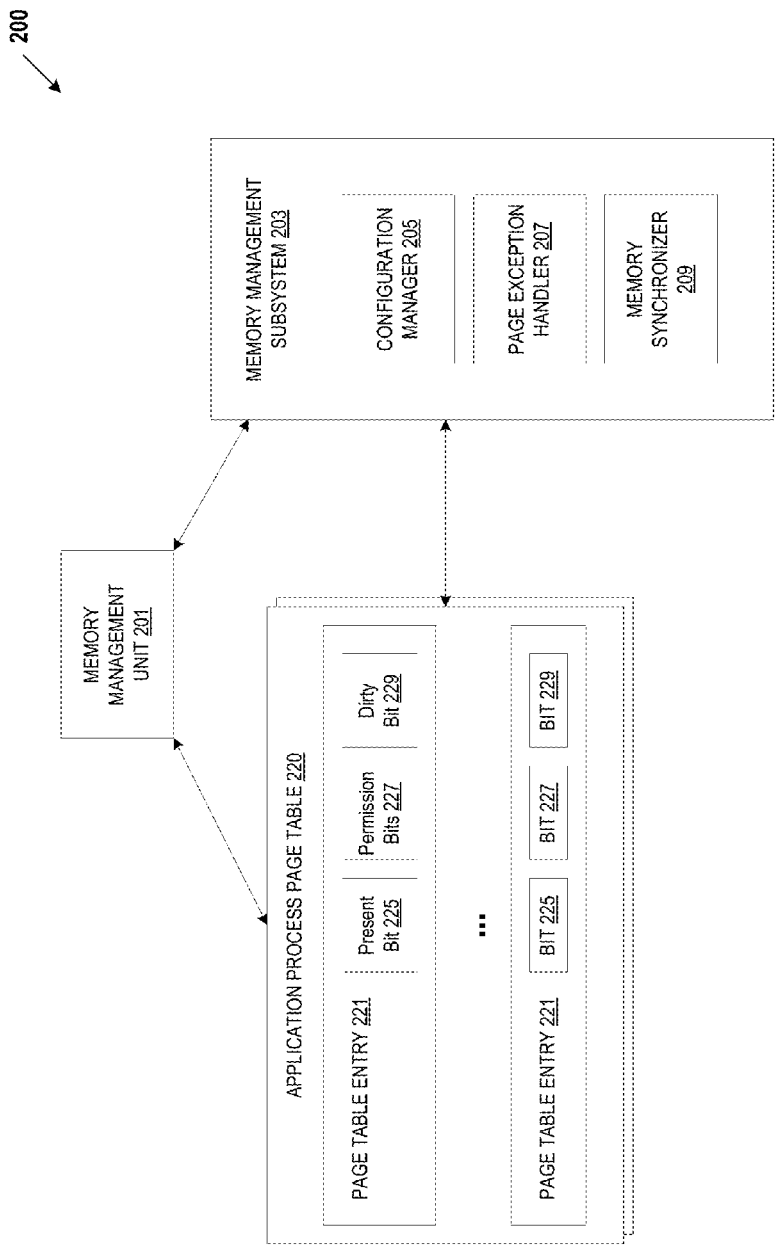
FIG. 2 is a block diagram of one embodiment of a memory management subsystem for configuring and managing access to shared memory.

FIG. 2 is a block diagram of one embodiment of a shared memory system 200 for configuring and managing access to shared memory. The shared memory system 200 includes a memory management subsystem 203, a memory management unit 201 coupled to the memory management subsystem 203, and application process page tables 220. The memory management unit 201 may be the same as the MMU 130 in the system 100 of FIG. 1. The memory management subsystem 203 may be the same as the memory management subsystem 140 in the system 100 of FIG. 1. The memory management subsystem 203 may include a configuration manager 205, a page exception handler 207, and a memory synchronizer 209.

The configuration manager 205 can receive a system call, such as mmap, from an application process which requests the operating system to map the application process to shared memory segments, such as segments of a file that is stored in a file system on disk, that are being accessed by processes of different applications and/or by different processes of the same application. The configuration manager 209 can create one or more mapping data structures to map an application process to the shared memory segments. Examples of mapping data structures include a task structure, mm structure, vm-area structure, application process page table (page table), etc. Exemplary mapping data structures are described in greater detail below in conjunction with FIGS. 4A-4G.

The configuration manager 205 can create and maintain one application process page table 220 per application process and can store the page tables 220 in the user memory space, such as user space 112 in the system 100 of FIG. 1. A page table 220 is a mechanism involving hardware-specific data structures that defines the relation between virtual addresses and physical addresses. A page table 220 contains page table entries 221 (PTEs), where each entry identifies a physical location of a page frame, for example, by a page frame number (PFN). Page frames are defined-length contiguous portions of physical memory (e.g., RAM) and may store any type of data.

The page table entries 221 can also include indicators, such as a present bit 225 to show whether a page is present in physical memory (e.g., RAM), one or more permission bits 227 to indicate, for example, the read and write permissions to access data in a page frame, and a dirty bit 229 to indicate whether data in a page frame has been modified since the data was last 'paged in'. A present bit 225 having a zero value can indicate that a page is not present in RAM. The permission bits 227 enable the safe sharing of page frames and control how the multiple application processes access (e.g., read and/ or write) the shared memory segments. The configuration manager 205 can set default values for the indicators 225, 227, 229, such as setting all of the present bits 225 to zero, the permissions bits 227 to permit read only access, and the dirty bits 229 to zero.

Application processes can send requests for accessing a page to the MMU 201. A read/write request includes a virtual address for the requested page. The MMU 201 can receive a read/write request having a virtual address from an application process and can attempt to locate a translation of the virtual address in the page table 220 for the application process.

When the MMU 201 detects that a page table entry 221 has a present bit 225 set to not present, the MMU 201 generates a processor interrupt (page fault interrupt or page fault), which invokes the page exception handler 207 to assume control from the MMU 201. The configuration manager 205 can set the present bits 225 to zero to cause a first read request or an first write request from any application process to be trapped by causing the MMU 201 to generate a page fault and the page exception handler 207 to gain operational control. The page exception handler 207 decides how to handle a page fault. Some embodiments for handling a page fault are described in greater detail below in conjunction with FIGS. 4A-4G.

When a page is eventually present in RAM, the configuration manager 205 creates a page table entry (PTE) 221 that maps the page to a page frame number (PFN) in the RAM. The configuration manager 205 can set the permission bits 227 in the PTE 221 in the page table 220 to read only access to create a copy-on-write trigger, such that when an application process makes a first attempt to write to data at the page frame number corresponding to the page, the MMU 201 can generate a page fault to invoke the page exception handler 207 to make a private copy of the data at the page frame number. The copy-on-write mechanism can be used to transparently migrate page data that is in a shared state to page data that is in a private state. An application process can write to the page data in that is in the private state. One embodiment for configuring, detecting, and handling a copy-on-write trigger is described in greater detail below in conjunction with FIG. 4C.

The memory synchronizer 209 can transparently migrate page data that is in a private state to page data that is in a shared state. The memory synchronizer 209 can use system synchronization calls, such as a msync system call, to share the modifications made to page data that is in a private state with other application processes. The memory synchronizer 209 can receive a synchronization request (e.g., a msync system call) from an application process and can examine, for example, the dirty bits 229 in the PTEs 221 in the application's page table 220 for any indication that the application process has made write modifications to any of the page data for the pages in the PTEs 221. When the memory synchronizer 209 finds a page has been modified as indicated by a dirty bit 229, the memory synchronizer 209 can replace the page data in a data store with the modified page data that is contained in a page copy that resides in a page frame in physical memory. The memory synchronizer 209 can clear the indicator, such as the dirty bit 229, in the page table entries 221.

The memory synchronizer 209 can unmap the current mappings in the page table entries 221 and set the present bits 225 back to a default value, such as zero. Thus, when an application makes a subsequent request to access a page, the page table entry 221 for the page has a present bit 225 set to zero and the MMU 201 generates a page fault, invoking the page exception handler 207. The page exception handler 207 can load the new data in the underlying hardware to RAM and update the page table 220 to map to the newly loaded data in RAM.

Figure 3:
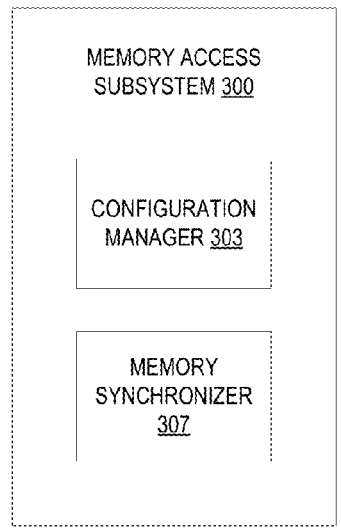
FIG. 3 is a block diagram of one embodiment of a memory access subsystem for accessing shared memory.

FIG. 3 is a block diagram of one embodiment of a memory access subsystem 300 for accessing shared memory. The memory access subsystem 300 may be the same as the memory access subsystem 150 in the system 100 of FIG. 1. The memory access subsystem 300 includes a configuration manager 303 and a memory synchronizer 307. The configuration manager 303 can send a mapping request, such as a mmap system call, to the operating system to request the operating system to map the application process to shared memory segments. The memory synchronizer 307 can send a synchronization request, such as a msync system call, to the operating system to request the operating system to migrate an application process' private copies of the shared memory segments from a private state to a shared state and to update the application process' page table to allow the application process access to any new data in the underlying hardware.

Figure 4A:
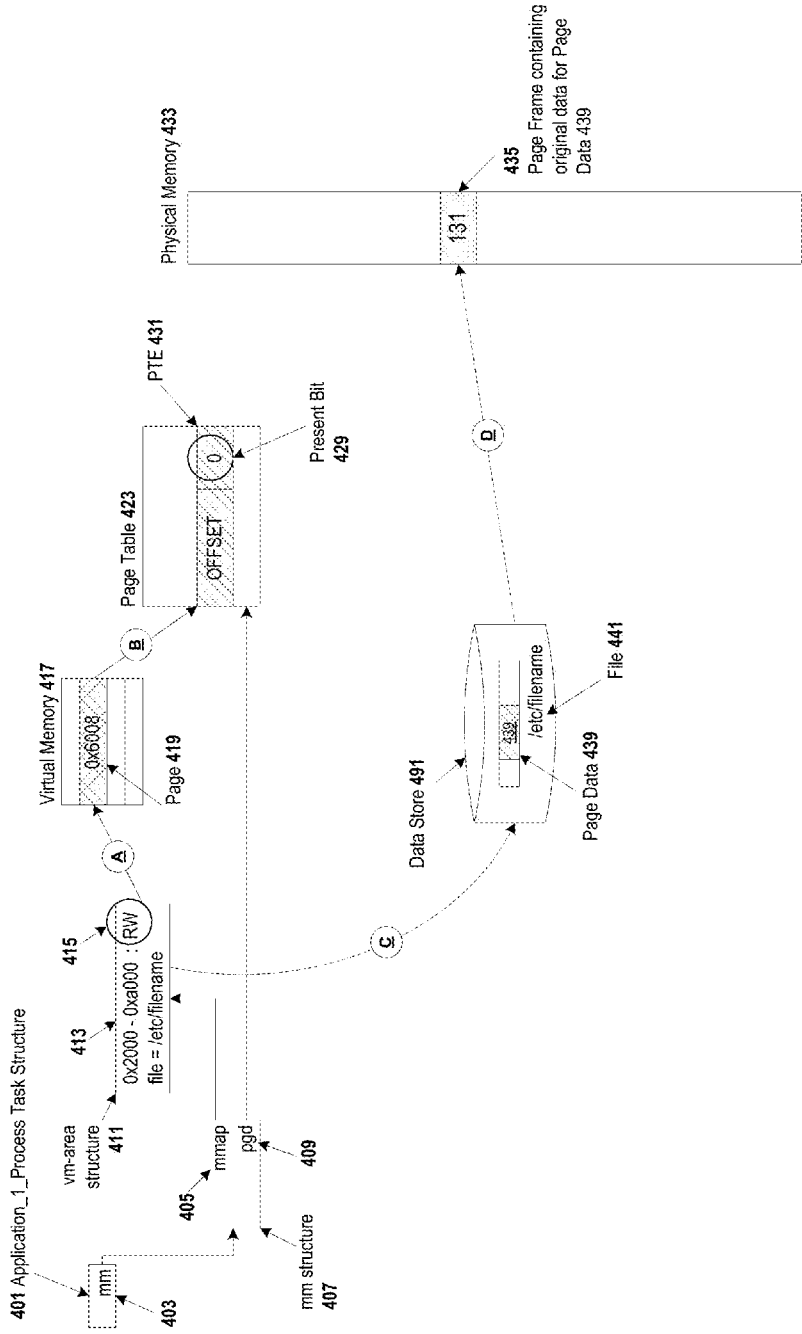
FIG. 4A illustrates a mechanism for configuring access for an application process to shared memory, in accordance with one embodiment.

FIG. 4A illustrates a mechanism for configuring access for an application process to shared memory, in accordance with one embodiment. An application process, such as Application_1_Process, can send a request to an operating system, such as a mmap system call, to be mapped to shared memory segments, such as file 441. A file 441 (e.g., /etc/filename/) is stored in a data store 491, such as a file system, and can be accessed by processes from different applications and by different processes of the same application. Physical memory 433 (e.g., RAM) can be shared by processes from different applications and by different processes of the same application. A data store can be a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set', as used herein, refers to any positive whole number of items.

The configuration manager 205 can create mapping data structures for the Application_1_Process, such as task structure 401, mm structure 407, vm-area structure 411, page table 423, etc. The memory management subsystem 203 can allocate a region of virtual memory 417 to Application_1_Process that is writable and occupies the virtual address range from 0x2000 to 0xa000. Task structure 401 includes a pointer 403 to a mm structure 407. The mm structure 407 represents the address space that is allocated to Application_1_Process and includes a pointer 405 (e.g., mmap) to a vm-area structure 411.

The vm-area structure 411 maps virtual address space of Application_1_Process to the underlying data, such as a file 441. The configuration manager 205 can set the access permissions 415 for the application process to 'RW' to allow read access and write access. The vm-area structure 411 can include the starting and ending address of the virtual address range 413. The vm-area structure 411 can map, for example, the first 32 Kbytes (four pages) of the file 441 to virtual memory 417 starting at virtual address 0x2000.

The mm structure 407 also has a pointer 409 (e.g, pgd), to a page table 423 for Application_1_Process. The pointer 409 can point to the global directory of a page table 423, but for simplicity the pointer 409 points to the page table 423. The configuration manager 205 can create appropriate page table entries (e.g., PTE 431) in a page table 423 when a range of virtual memory 417 is allocated to an application and can initially mark all of the pages 419 as not present using a present bit 429 in the PTEs 431. The present bit 429 can be set to zero to indicate that a page 419 is not resident in physical memory 433, which will trigger a memory management unit (MMU) 201 to generate a page fault, which is then handled by a page exception handler 207.

For example, the first time when the Application_1_Process attempts to access a page 419 at virtual address 0x6008 (reference A), a MMU 201 detects that the present bit 429 for the corresponding page table entry 431 is set to zero (reference B), and generates a page fault. In response to the page fault, the page exception handler 207 searches the vm-area structure 411 and determines that virtual address 0x6008 corresponds to page data 439 that is stored in file 441 in data store 491. The page exception handler 207 allocates a new physical page frame, such as page frame number 131 (435) in physical memory 433, and initiates a read from the data store 491 (reference C) of the page data 439, and copies the page data 439 that corresponds the page 419 at virtual address 0x6008 to the available page frame number 131 (435) (reference D). Page 419 is now resident in physical memory 433 at page frame number 131 (435).

Figure 4B:
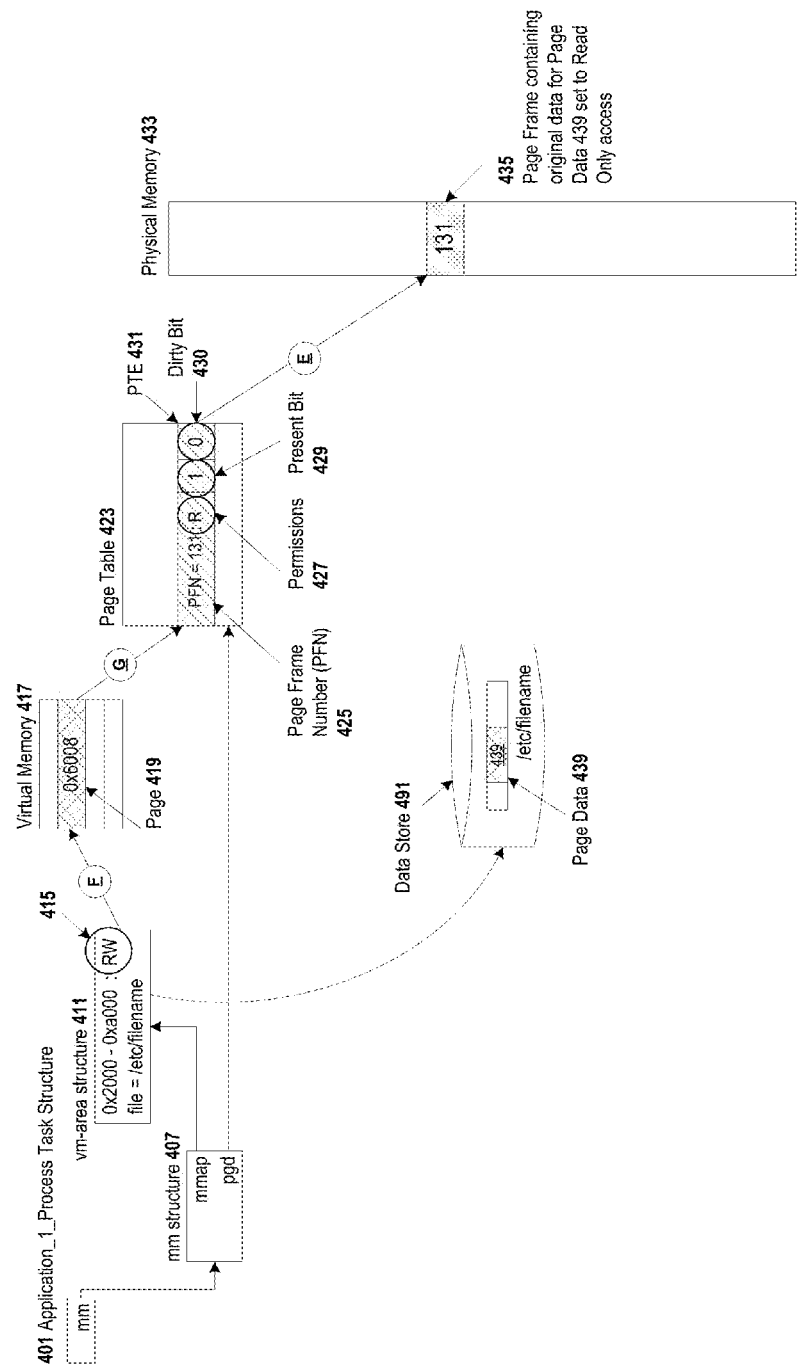
FIG. 4B illustrates a mechanism for updating a page table to map a page to a physical page frame in physical memory, in accordance with one embodiment.

FIG. 4B illustrates a mechanism for updating a page table to map a page at a virtual address to a physical page frame in physical memory, in accordance with one embodiment. The page exception handler 207 updates the PTE 431 in the page table 423 to map (reference E) the page 419 at the virtual address 0x6008 to the physical page frame 131 (435) in physical memory 433, which now contains the page data 439 in its original state. The page exception handler 207 updates the PTE 431 to include a physical page frame number (PFN) 425, the access permissions 427 for accessing the PFN 131 (435), and a dirty bit 430 to indicate whether there has been a write access to the page (e.g., page 419). The page exception handler 207 can set the dirty bit 430 to a default value, such as zero. One embodiment of synchronizing memory using the dirty bit 430 is described in greater detail below in conjunction with FIG. 4G. The page exception handler 207 sets the present bit 429, for example to one, to indicate that the page 419 is now resident in physical memory 433.

The page exception handler 207 also sets the permission bits 427 in PTE 431 to 'R' to grant Application_1_Process read only access to the page frame number 131 (435). The page exception handler 207 can create a copy-on-write trigger using the page table 423 of the application by setting the permission bit 427 to 'R' which is in conflict with the permission bits 415 in the vm-area structure 411, such that when Application_1_Process attempts to write to page frame number 131 (435), the MMU 201 generates a page fault and the page exception handler 207 can create a copy of page data 439 in a private state for the Application_1_Process to modify.

Application_1_Process can resume execution to allow a request, such as request A in FIG. 4A, to be restarted. If the request is a read request, the MMU 201 uses the mapping in PTE 431 to return the original data for page data 439 that resides in page frame number 131 (435). If the request is a write request, the MMU 201 generates a page fault because the write request is in conflict with the read only permission 427 in PTE 431, and transfers control to the page exception handler 207. For example, as shown in FIG. 4B, when the Application_1_Process makes a request to write to page 419 (reference F), the MMU 201 will detect (reference G) that the write request is in conflict with the read only permission 427 of the page at PFN 131 (435) in the page table 423 and generate a page fault to invoke the page exception handler 207 to take control.

Figure 4C:
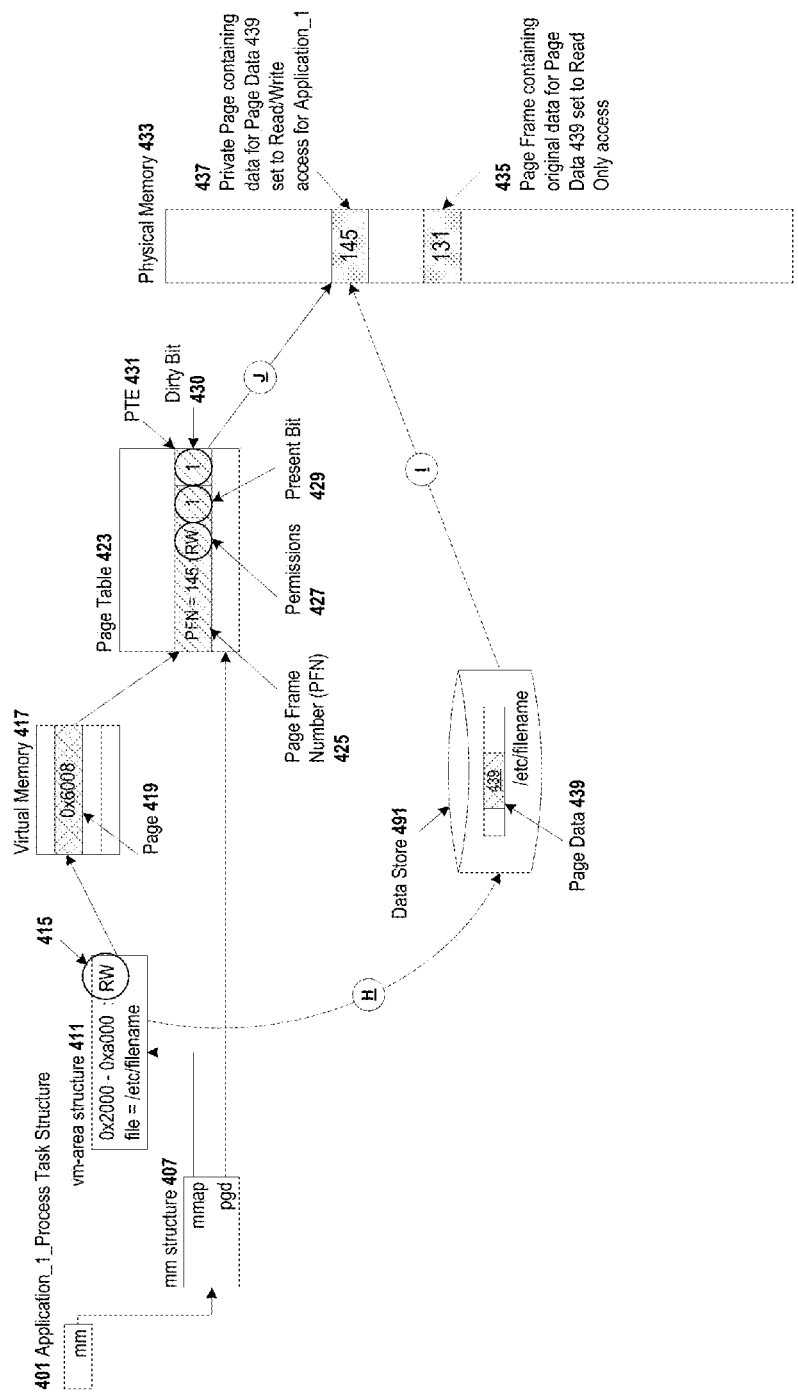
FIG. 4C illustrates a mechanism for configuring, detecting, and handling a copy-on-write trigger, in accordance with one embodiment.

FIG. 4C illustrates a mechanism for configuring, detecting, and handling a copy-on-write trigger, in accordance with one embodiment. The page exception handler 207 can detect and handle a page fault generated by the MMU 201 in response to the MMU 201 detecting (reference G in FIG. 4B) that the write request is in conflict with the read only permission of the page at PFN 131 (435) in the page table 423. As shown in FIG. 4C, the page exception handler 207 can mark the PTE 431 to indicate that the page data 439 is being changed by a write modification. For example, the page exception handler 207 sets a dirty bit 430 in the PTE 431 to indicate whether there has been a write access to the page (e.g., page 419) since the dirty bit 430 was last cleared. For instance, the page exception handler 207 can set the dirty bit 430 to one to indicate that there has been a write access. One embodiment of synchronizing memory using the dirty bit is described in greater detail below in conjunction with FIG. 4G.

The page exception handler 207 can allocate a new physical page frame, such as page frame number 145 (437) in physical memory 433, read the page data 439 in the data store 491 (reference H), and place another copy of the page data 439 to the available page frame number 145 (437) (reference I). Page 419 is now resident in physical memory 433 at page frame number 145 (437) and at page frame number 131 (435). However, the page exception handler 207 can change the permission bits 427 in PTE 431 to 'RW' to grant Application_1_Process both read access and write access to the page frame number 145 (437) and update the PFN 425 entry in the PTE 431 to map to the new page number 145 (437) (reference J). Application_1_Process can resume execution to allow the write request to be restarted, to complete successfully, and to return the file data 439 contained in page frame 145 (437).

Page frame number 145 (437) is a page copy of page data 439 and is in a private state that allows Application_1_Process to make modifications to the data in page frame number 145 (437). Other applications that request access to page 419 can have read access to page frame number 131 (435), which remains in a shared state and contains the page data 439 in its original form. Other applications cannot have access to the page copy 437 of Application_1_Process until Application_1_Process allows the other applications access to its page copy 437. The memory management subsystem 203 can use the copy-on-write mechanism to transparently migrate between page data that is in a shared state (e.g., page data at PFN 131 (435)) to page data that is in a private state (e.g., page data at PFN 145 (437)). The memory management subsystem 203 can use synchronization system calls, such as a msync system call, to transparently migrate the page data that is in a private state (e.g., page data at PFN 145 (437)) to a shared state. One embodiment of using a synchronization system call to migrate page data in a private state to a shared state is described in greater detail below in conjunction with FIG. 4G.

Figure 4D:
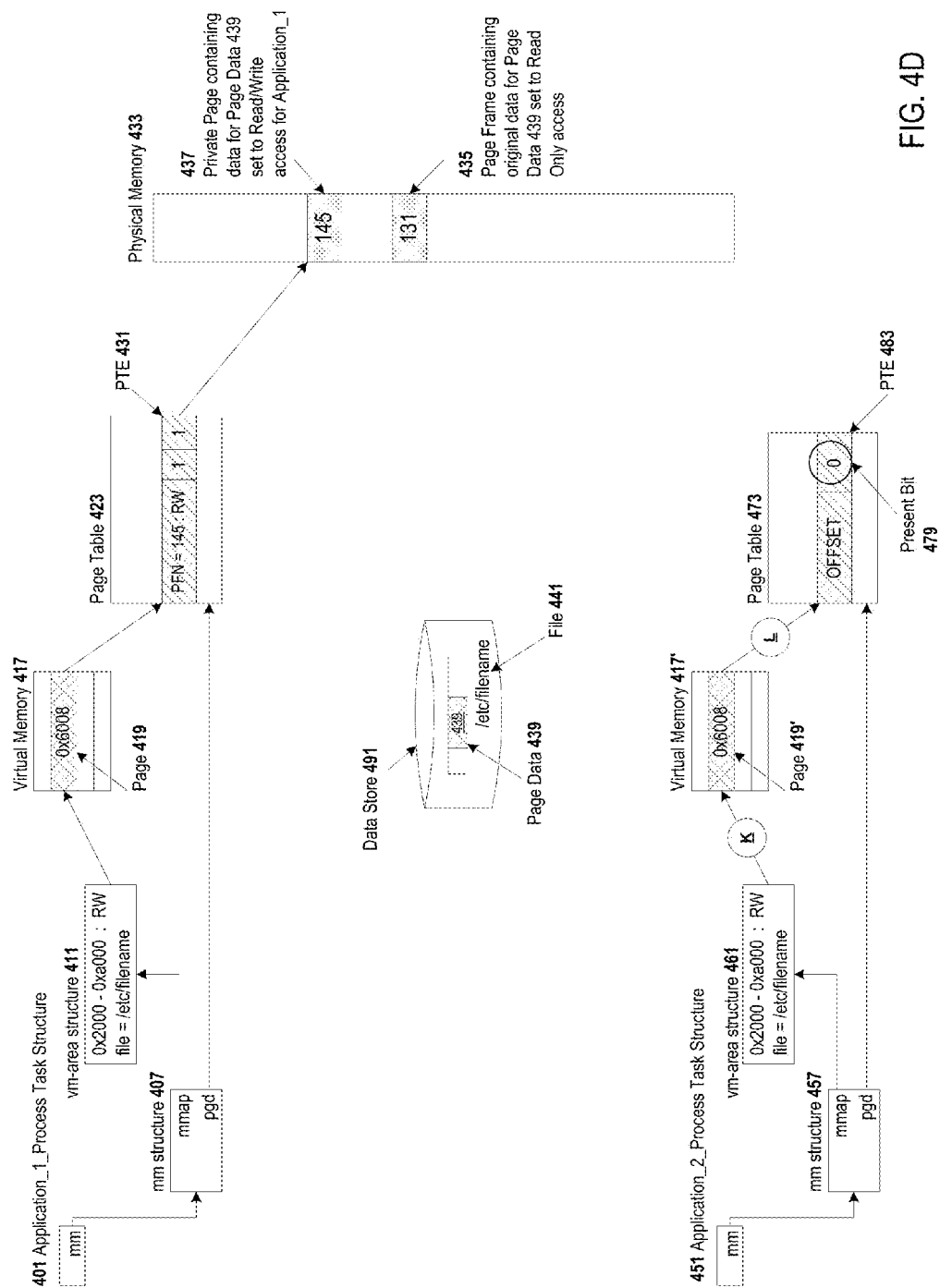
FIG. 4D illustrates a mechanism for configuring access for a second application process to virtual memory that is already being accessed by another application process, in accordance with one embodiment.

FIG. 4D illustrates a mechanism for configuring access for a second application process to virtual memory that is already being accessed by another application process, in accordance with one embodiment. Multiple processes from different applications and/or in the same application can share access to memory (e.g., RAM). A second application process, such as Application_2_Process, can send a request to the operating system, such as a mmap system call, to be mapped to shared memory segments, such as file 441, which is already being accessed by another application, for example, Application_1_Process. Application_2_Process can be an application that is different from the application of Application_

1_Process or can be an application that is the same as the application of Application_1_Process.

The configuration manager 205 can create mapping data structures for the Application_2_Process, such as task structure 451, mm structure 457, vm-area structure 461, page table 473, etc. The configuration manager 205 can configure the present bits 479 in the PTEs 483 in the page table 473 all to zero to cause the MMU 201 to generate a page fault to trap any request from the Application_2_Process that is a first request for a particular page of the shared memory. For example, even though page 419 is already resident at physical page frame number 131 (435), the configuration manager 205 can still set the present bit 479 for page 419' to zero to cause the MMU 201 to generate a page fault when the Application_2_Process makes a first request to access page 419'.

For instance, when Application_2_Process makes a first attempt to access page 419' at virtual address 0x6008, (reference K), the MMU 201 detects that the present bit 479 for the PTE 483 that corresponds to page 419' is set to zero (reference L), and generates a page fault. The page exception handler 207 determines whether the access request K is a read request. When K request is a read request, the page exception handler 207 can update the page table 473 to map to page frame 131 (435), which already contains the page data 439 in its original state as further illustrated in FIG. 4E (reference M).

Figure 4E:
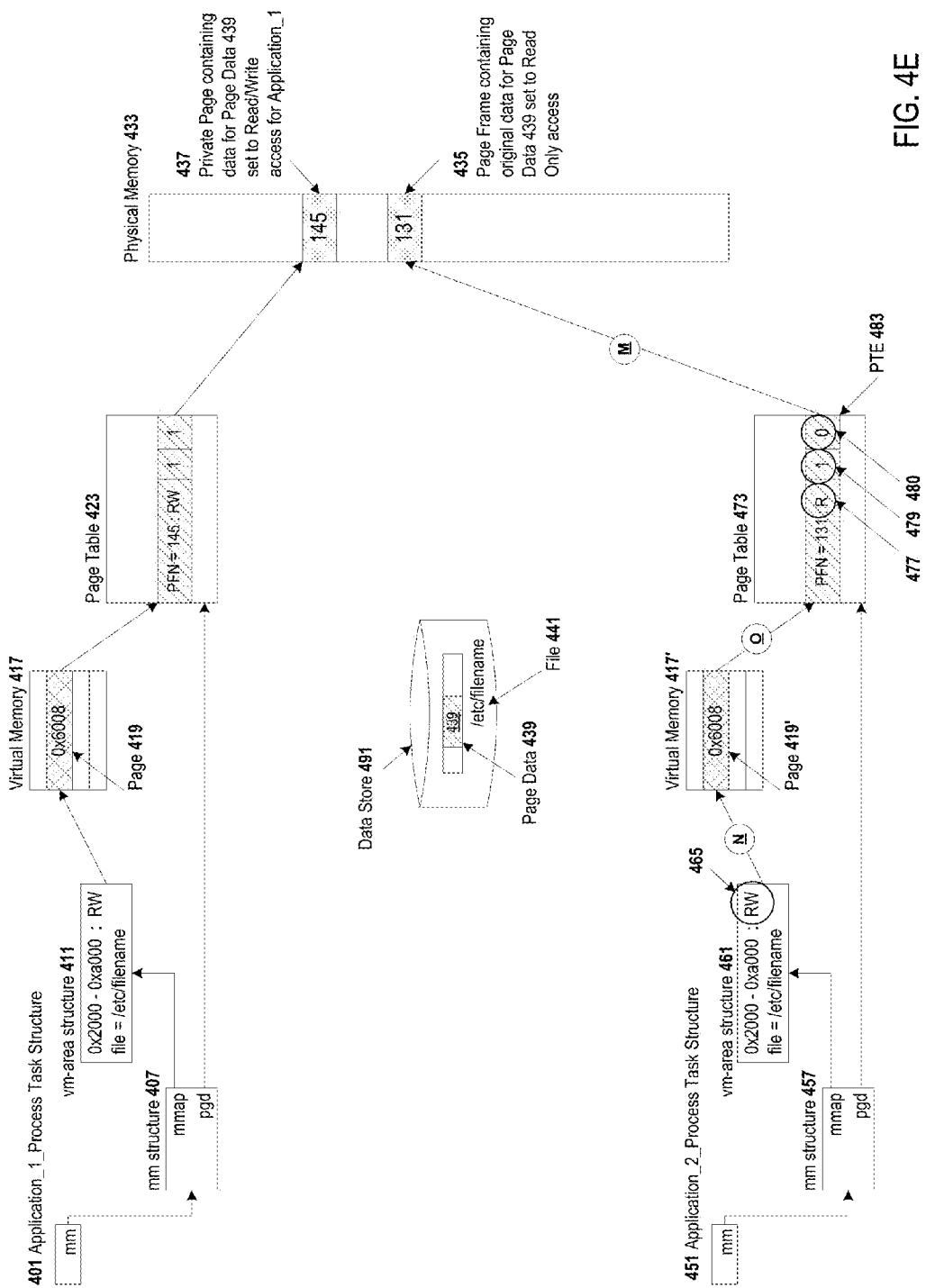
FIG. 4E illustrates a mechanism for configuring read access for a second application process to page data in its original state, in accordance with one embodiment.

FIG. 4E illustrates a mechanism for configuring read access for a second application process to page data in its original state, in accordance with one embodiment. The page exception handler 207 can update the PTE 483 in the page table 473 to map (reference M) the page 419' at the virtual address 0x6008 to the physical page frame 131 (435) in physical memory 433, which is in a shared state and still contains the page data 439 in its original state. The page exception handler 207 sets the present bit 479, for example to one, to indicate that the page 419' is now resident in physical memory 433 so as to prevent any page faults for any future read requests for page 419'. The page exception handler 207 also sets the permission bits 477 to 'R' to grant Application_2_Process read only access to the page frame number 131 (435).

The page exception handler 207 creates a copy-on-write trigger for Application_2_Process. For example, the page exception handler 207 can set the permission bit 477 to 'R' which is in conflict with the permission bits 465 in the vm-area structure 461, such that when an application, such as Application_2_Process, attempts to write to page frame number 131 (435), the MMU 201 generates a page fault and the page exception handler 207 can create a copy of page data 439 in a private state for the Application_2_Process to modify. Application_2_Process can resume execution to allow the read request to be restarted, to complete successfully, and to return the file data 439 in its original state from page frame 131 (435). Other applications can continue to write to their copies of the page data 439 in a private state, such as Application_1_Process writing to its copy at page frame 145 (437) in a private state. However, when the Application_2_Process makes a request to write to page 419' (reference N), the MMU 201 will detect (reference O) that the write request is in conflict with the read only permission 477 of the page at PFN 131 (435) in the page table 473, and generate a page fault to invoke the page exception handler 207 to take control.

Figure 4F:
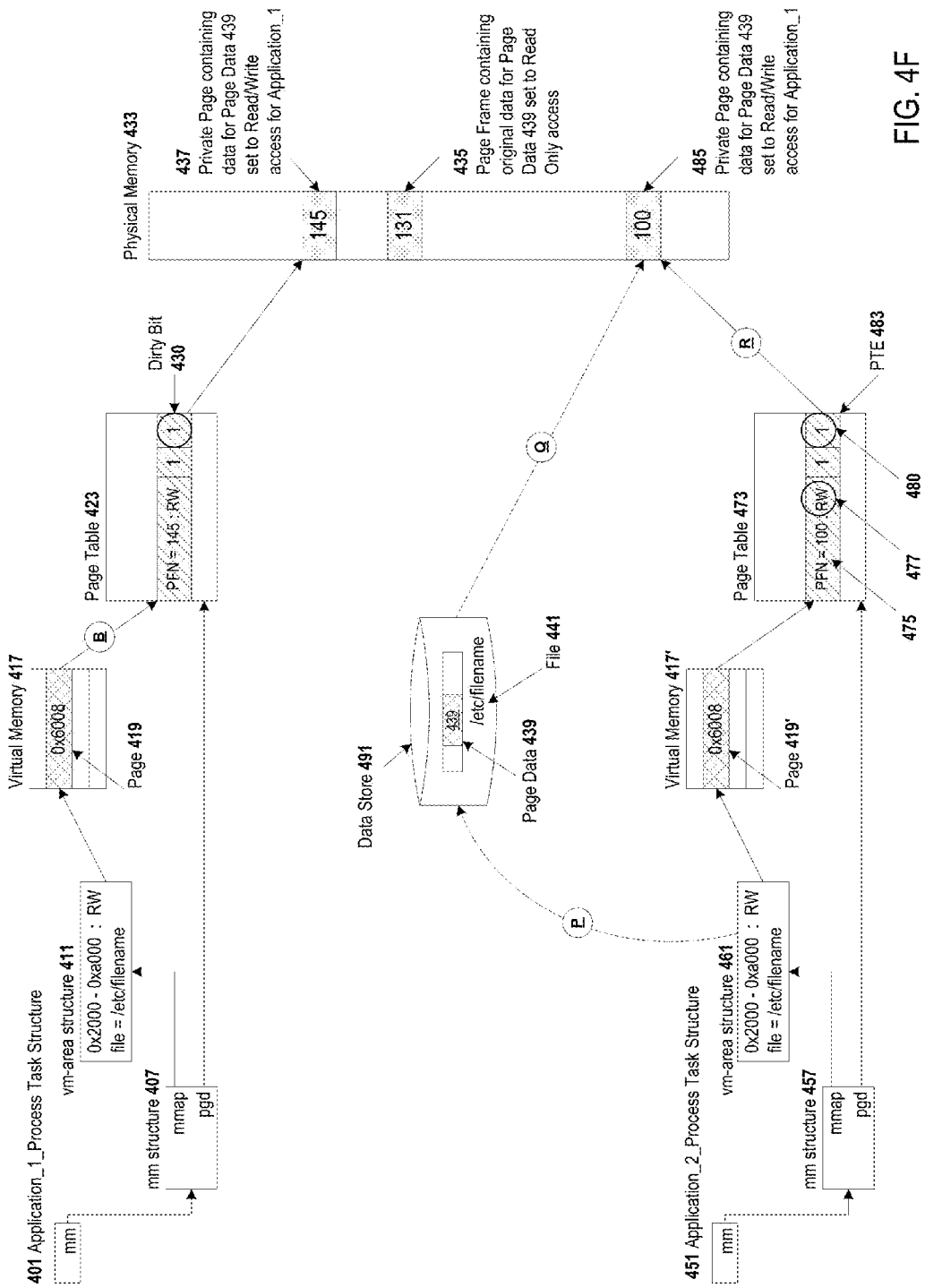
FIG. 4F illustrates a mechanism for creating a private page copy for an application process to modify, in accordance with one embodiment.

FIG. 4F illustrates a mechanism for creating a page copy in a private state for an application process to modify, in accordance with one embodiment. The page exception handler 207 can allocate a new physical page frame, such as page frame number 100 (485) in physical memory 433, initiate a read from the data store 491 (reference P) of page data 439, and place another copy of the page data 439 that corresponds the page 419' to the available page frame number 100 (485) (reference Q). Page 419' is now resident in physical memory 433 at page frame number 100 (485) and at page frame number 131 (435). However, the page exception handler 207 can change the permission bits 477 in PTE 483 to 'RW' to grant Application_2_Process both read and write access to the page frame number 100 (485) and update the PFN 475 entry in the PTE 483 to map (reference R) to the new page frame number 100 (485). Application_2_Process can resume execution to allow the write request to be restarted, to complete successfully, and to return the file data 439 contained in page frame 100 (485).

Page frame number 131 (435) is still in a shared state and contains the page data 439 in its original form. Page frame number 100 (485) is a page copy of page data 439 in a private state that allows Application_2_Process to make modifications to the data in page frame number 100 (485) in the private state. Other applications that request access to page 419' (page 419) can have read access to page frame number 131 (435) in the shared state.

Traditionally, a parent process and a child process from the same application can share access to the same data in memory and can use a copy-on-write mechanism to allow each process to write to its own copy of the data. The child process inherits the same mapping parameters for the parent process. However, a parent process can only specify either MAP_SHARED or MAP_PRIVATE, but not both. Thus, a parent process cannot first hide its modifications to data from the child process and then make its modifications visible to the child process.

Embodiments of the present invention enable processes from different applications and/or different processes of the same application to do both, to transparently migrate page data between a shared state to a private state using a copy-on-write mechanism and to transparently migrate page data in a private state to a shared state using a system call, such as a msync system call. As seen in FIG. 4F, Application_1_Process can make modifications to page data 439 using its private copy of the page data 439 in page frame number 145 (437) and Application_2_Process can make modifications to page data 439 using its private copy of the page data 439 in page frame number 100 (485). Other applications, such as Application_1_Process, cannot have access to the page copy 485 of Application_2_Process until Application_2_Process allows the other applications access to its page copy 485. Similarly, other applications, such as Application_2_Process, cannot have access to the page copy 437 of Application_1_Process until Application_1_Process allows the other applications access to its page copy 437. An application can allow other applications access and can access modifications made by other applications by sending a synchronization system call (e.g., msync) to the operating system to synchronize the shared memory.

Figure 4G:
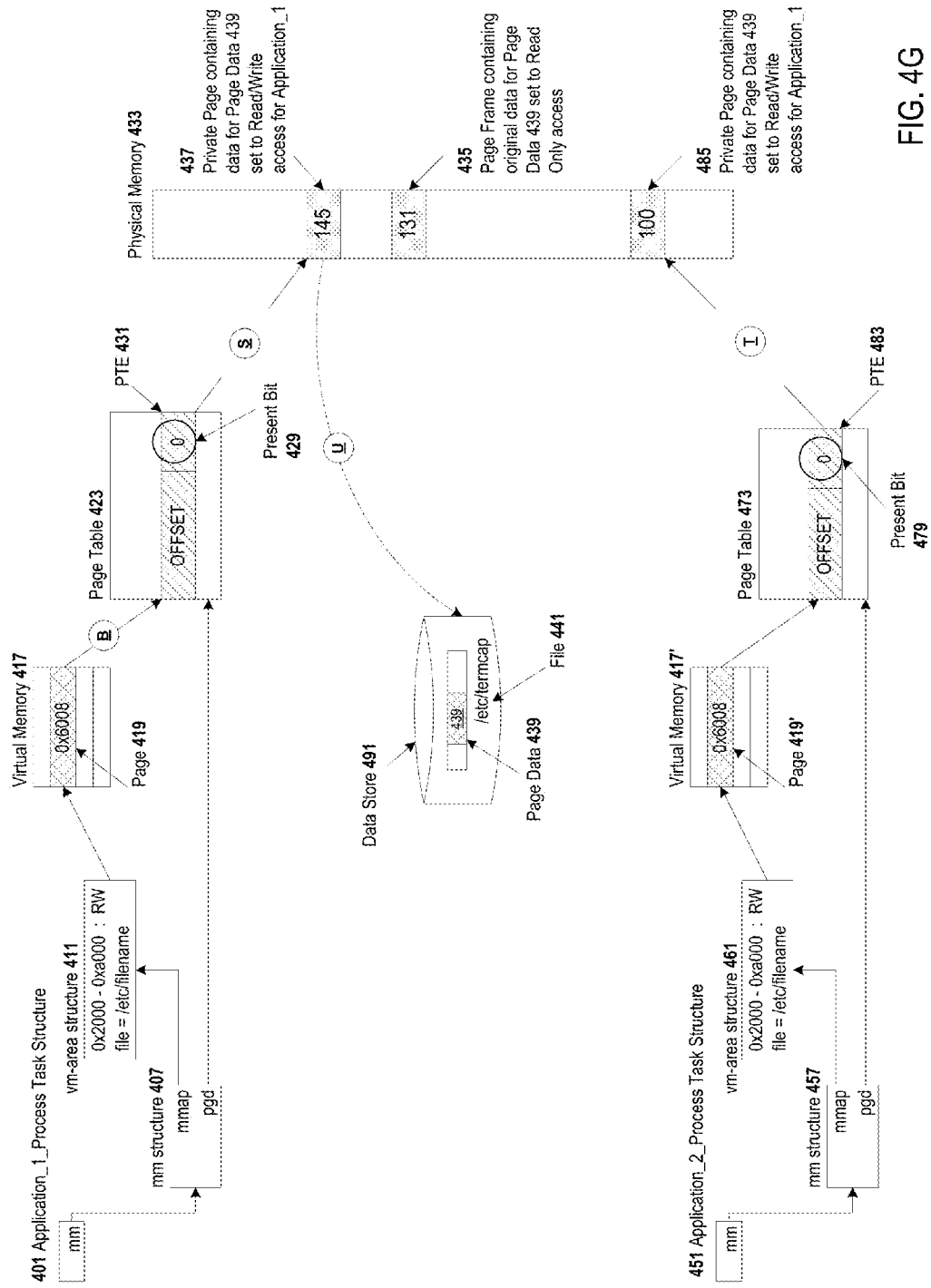
FIG. 4G illustrates a mechanism for synchronizing shared memory, in accordance with one embodiment.

FIG. 4G illustrates a mechanism for synchronizing shared memory, in accordance with one embodiment. Multiple processes from different applications, such as Application_1_Process and Application_2_Process, can have pages in private states in the physical memory 433 and modify their private pages. A duration for which an application process makes a first read or write request until the application process synchronizes the memory, such as with a msync system call, is hereinafter referred to as a 'critical section.' While Application_1_Process is accessing memory during its critical section, the changes in Application_1_Process' private page 437 are not yet accessible to Application_2_Process until the Application_1_Process sends a synchronization call (e.g., msync) to the operating system to end its critical section. Similarly, while the Application_2_Process is accessing memory during its critical section, Application_1_Process is not able to access to changes in Application_2_Process' private page 485 until the Application_2_Process sends a synchronization call to the operating system.

When an application process is finished accessing its critical section, it can make a synchronization system call (e.g., a msync system call) to request the operating system to make the application's private pages now accessible to other application processes and to update the mappings in the application's page table to allow the application access to any changes in the data (e.g., page data 439 in data store 491) which other application processes may have made. The operating system memory synchronizer 209 can receive a msync call from Application_1_Process and can examine the dirty bit 430 in the application's page table 423 for any indication that the Application_1_Process has made write modifications to page data. For any dirty bits 430 that are enabled (e.g., dirty bit 430 in FIG. 4F is set to one), the memory synchronizer 209 can replace the page data 439 in the data store 491 with the modified page data that is contained in the private page 437 in the physical memory 433 (reference U).

The memory synchronizer 209 can update the application's page table 423 to unmap the mappings (e.g., broken arrow reference S) in the page table entries. The memory synchronizer 209 can unmap the private page 437 and unmap any mappings to original page data used for read only access (e.g., a mapping to page frame 131 (435)). The memory synchronizer 209 can set the present bits 429 in the page table entries 431 to zero, such that, the next time the Application_1_Process makes a read or write request for a page at a virtual address, the page exception handler 207 is invoked. For a read request, the page exception handler 207 copies the page data 439 stored in the data store 491, which is the most recent version of the page data that has been committed to the underlying storage, to an available page frame in the physical memory 433 and maps the page table 423 to the page frame number containing the most recent page data. For a write request, the page exception handler 207 determines whether to create a copy of the page data in a private state for the Application_1_Process to modify.

In order for Application_2_Process to access the replacement page data 439 (result of reference U) in the data store 491 that reflects the changed data in Application_1_Process' private page 437, the Application_2_Process can send a msync system call to the operating system to request the operating system to update its page table 473. The memory synchronizer 209 can receive the msync system call and unmap the mappings (e.g., broken arrow reference T) in the page table entries 483 in the page table 473. The memory synchronizer 209 can unmap the private page 485 and unmap any mappings to original page data used for read only access (e.g., a mapping to page frame 131 (435)). The memory synchronizer 209 can set the present bits 479 in the page table entries 483 to zero, such that, the next time the Application_2_Process makes a read or write request for a page, the page exception handler 207 is invoked to map to a most recent version of the page data in a shared state for a read request and/or to determine whether to create a copy of the page data in a private state for a write request.

Figure 5:
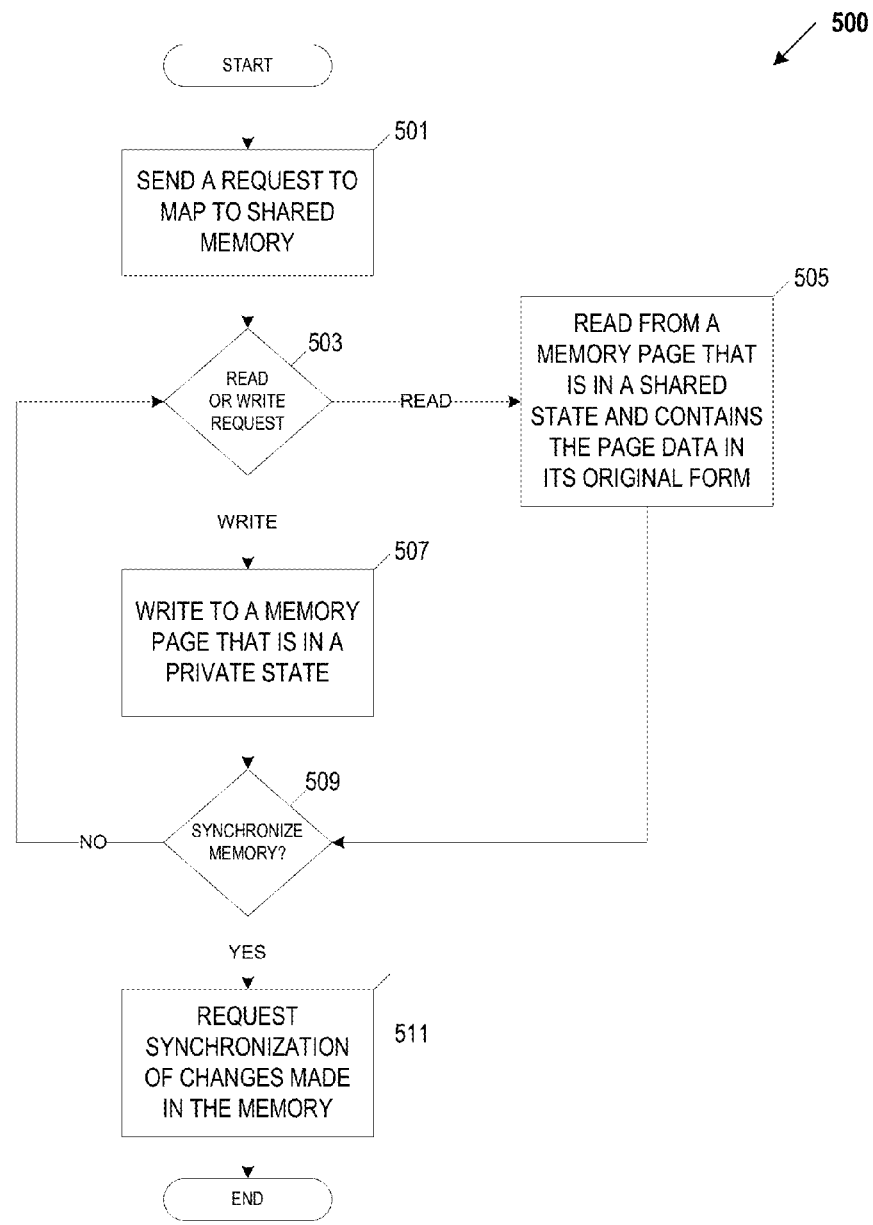
FIG. 5 is a flow diagram of an embodiment of a method for accessing shared memory.

FIG. 5 is a flow diagram of an embodiment of a method 500 for an application accessing shared memory. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the memory access subsystem 150 hosted by a computing system 100 of FIG. 1.

In one embodiment, the method 500 starts with the memory access subsystem sending a request, such as an mmap system call, to the operating system to map its virtual memory space to data stored in a data store, such as a file stored in a file system on disk, that is already being accessed by another application process at block 501. At block 503, the subsystem sends a read or write request to a MMU for access to page data that is stored in the data store. If the request is a read request, the subsystem reads from data in a page frame in the physical memory that is in a shared state and contains the page data in its original form (containing the page data that is most recently committed to the data store) at block 505. If the request is a write request (block 503), the subsystem writes modifications to a page frame in the physical memory that contain a copy of the page data in a private state at block 507. The private page frame is accessible by the application process which requested write access to this page data and is not accessible by other application processes until the requesting application process allows the other applications access to the private page frame. Other application processes can continue to read from the page frame that is in a shared state and contains the page data in its original form.

At block 509, the subsystem determines whether to end its critical section and to synchronize memory. The start of a critical section is when an application process makes a first read/write request (e.g., a request at block 503) and ends when the application processes makes a synchronization request. An application process can make multiple read/write requests during its critical section.

The subsystem can determine whether the application process is finished reading from a page in a shared state and/or writing to a page in a private state by receiving instructions to send a synchronization call (e.g., msync) to an operating system. If the subsystem does not receive instructions to send a synchronization call to the operating system (block 509), the subsystem returns to block 503 to make another read/write request. If the subsystem receives instructions to send a synchronization call to the operating system (block 509), the subsystem sends a synchronization request (e.g., msync system call) to the operating system requesting the operating system to synchronize the memory at block 511. Synchronizing memory can include the subsystem sending a request to the operating system to replace the page data in the underlying memory with the page data in the private page and/or to request the operating system to update a page table for access to any recently committed page data in the underlying hardware.

Figure 6:
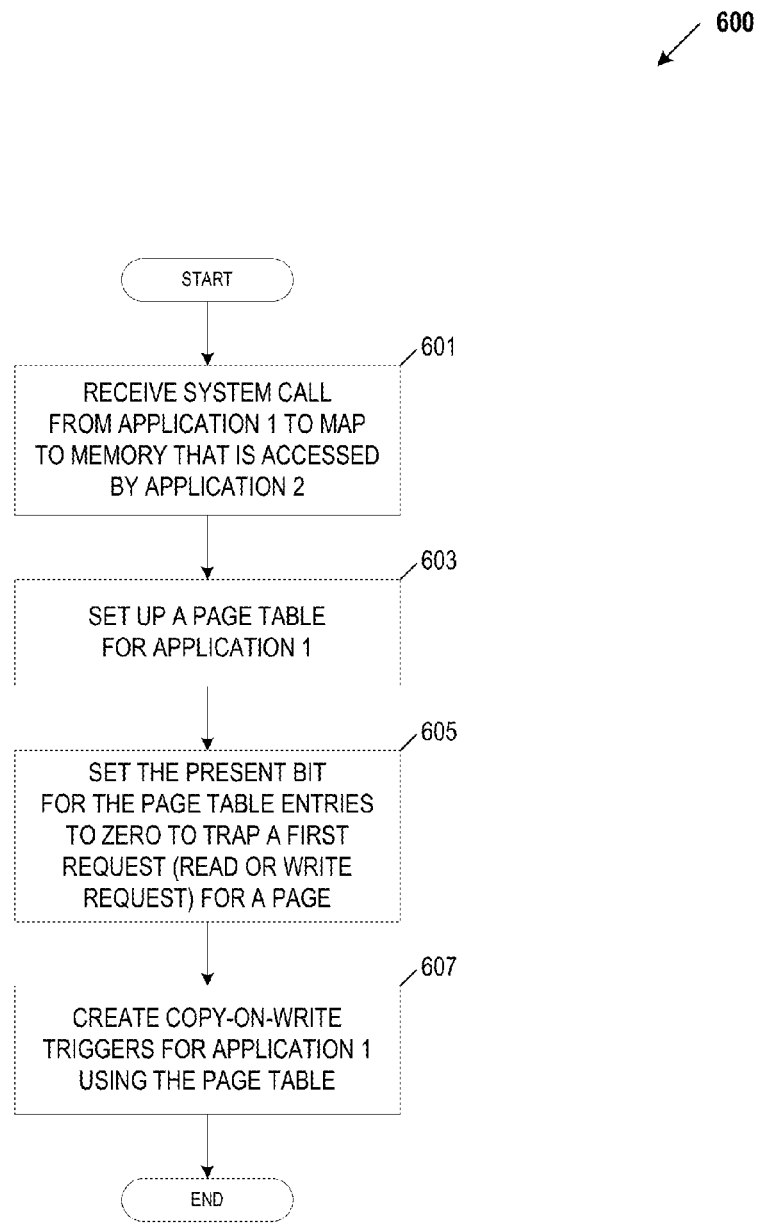
FIG. 6 is a flow diagram of an embodiment of a method for configuring an application process for access to shared memory.

FIG. 6 is a flow diagram of an embodiment of a method 600 for configuring access to shared memory for an application process. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the memory management subsystem 140 in a computing system 100 of FIG. 1.

In one embodiment, the method 600 starts with the memory management subsystem receiving a system call, such as mmap, from an application process 1 which declares to the operating system that application process 1 wishes to be mapped to a memory segment at block 601. The memory segment can be a segment that is being accessed by other application processes, such as application process 2. A system call, such as mmap, maps files or devices into memory.

At block 603, the subsystem creates mapping data structures to map the virtual memory for the application process 1 to the underlying physical memory. Examples of mapping data structures include a task structure, mm structure, vm-area structure, application process page table (page table), etc. The subsystem creates a page table for the application process 1 and page table entries for pointing pages at virtual addresses to page frames in physical memory. At block 605, the subsystem sets the present bit in the page table entries to zero to cause a first request (e.g., read or write request) for a page to be trapped and handled by a page exception handler.

At block 607, the subsystem creates copy-on-write triggers for the application process 1 using the application's page table. The copy-on-write triggers can cause a copy of original the page data that is stored in a data store to be created when an application process 1 makes a first request for write access to a page at a virtual address. In one example, the subsystem enables a bit in a page table entry to create a copy-on-write mechanism. In another example, the subsystem can create a copy-on-write mechanism by setting the access permissions in the vm-area structure to allow read access and write access and setting the permission bits in the page table entries in the page table to read only access to be in conflict with the permissions set in the vm-area structure. The conflict triggers the copy-on-write such that when an application process 1 makes a first attempt to write to the original page data, a memory management unit can generate a page fault, and the page exception handler can create the copy of the original page data in a private state for the application to write to.

Figure 7:
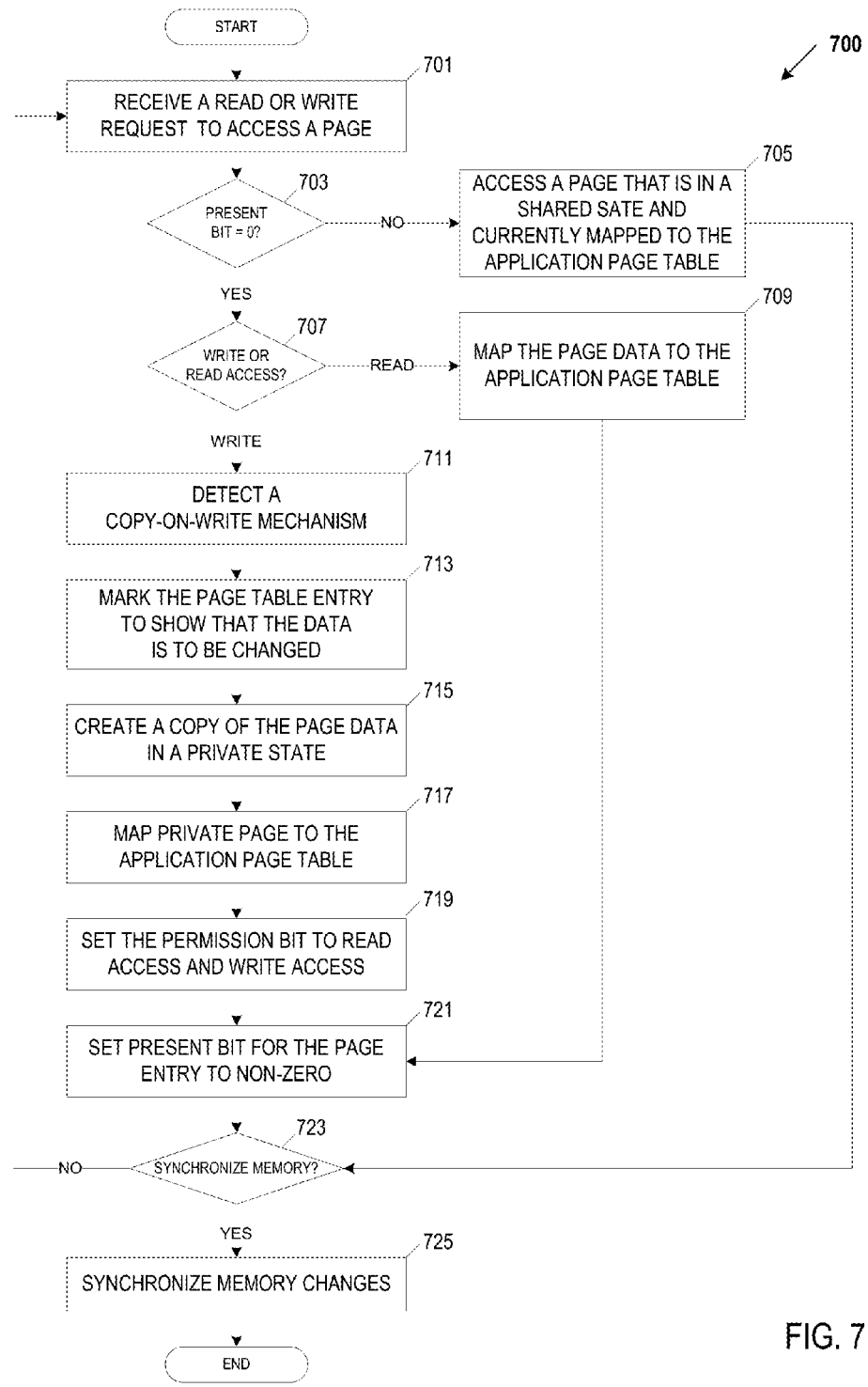
FIG. 7 is a flow diagram of an embodiment of a method for managing access to shared memory.

FIG. 7 is a flow diagram of an embodiment of a method 700 for managing access to shared memory. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the memory management subsystem 140 in a computing system 100 of FIG. 1.

In one embodiment, the method 700 starts with the memory management subsystem receiving an access request from an application process to access a page at block 701. The subsystem determines whether the present bit for the page table entry that corresponds to the page is set to zero at block 703. A present bit that is set to zero invokes the subsystem's page exception handler to manage the access request. If the present bit is set to zero (block 703), the subsystem's page exception handler determines whether the access request is a read request or a write request at block 707.

If the request is a read request (block 707), the subsystem configures the page table to map to the page data corresponding to the page at block 709. For example, if the page data for the page is already resident in a page frame in the physical memory, the page exception handler creates a page table entry or updates a page table entry to map to that particular page frame. If the page data for the page is not already resident in a page frame in the physical memory, the page exception handler, copies the page data for the page that was most recently committed to the underlying hardware (e.g., file system disk) to an available page frame in the physical memory, and creates a page table entry or updates a page table entry to map to that particular page frame. The application process can read the page data in its most recent state (as stored in the data store) from a page frame without reading any page data that may have been modified by another application process.

If the request is a write request (707), the subsystem detects there is a copy-on-write mechanism at block 711. For example, the subsystem can detect that the permissions granted in the page table entry are different from the permissions in a vm-area structure. For instance, the subsystem can detect a copy-on-write trigger when the page table entry grants read only access and the vm-area structure grants both read access and write access. Another example of copy-on-write triggers can include enabling a copy-on-write bit in a page table entry.

At block 713, the subsystem marks the page table entry to indicate that the page data that corresponds to the entry is to be changed with a write modification. For example, the subsystem can set a flag, such as a dirty bit, for the entry to one to indicate that the page data corresponding to the entry is to be changed.

At block 715, the subsystem creates a copy of the page data in a private state for the application process to modify. The subsystem copies the page data for the page from a data store (e.g., file system disk) to an available page frame in the physical memory. At block 717, the subsystem creates a page table entry or updates an existing page table entry to map the page to that particular page frame that contains the application's private copy of page data.

At block 719, the subsystem sets the permission bits in the page table entry to read access and write access for the private page. The application process can read from and write modifications to the page data in the page frame that contains the application's private copy of page data. Other applications cannot have access this private page until the application allows the other applications access. The original page data (page data that the most recently committed data in the underlying hardware) can be maintained in its current state until the application synchronizes the memory. Other application processes can continue to read the original page data from a page frame in the physical memory that is in a shared state until they request that the shared memory be synchronized. One embodiment of synchronizing the shared memory is described in greater detail below in conjunction with FIG. 8.

At block 721, the subsystem sets the present bit in the page table entry to non-zero for the private page. During the critical section, an application process may make multiple write requests and read requests to the same page. The subsystem changes the present bit to non-zero (block 721) such that when the application process makes another write request or read request to the same page, the request does not invoke the page exception handler, but allows the application process to continue to have write access and read access to the same copy of the page that is currently mapped in the page table.

For example, at block 723, the subsystem determines whether it has received a request from the application process to synchronize the shared memory. The subsystem can receive a synchronization system call, such as msync, from an application process to synchronize the shared memory. If there is a synchronization request (block 723), the application process is finished with its critical section and the subsystem can synchronize the changes made to the shared memory at block 725. One embodiment of synchronizing the shared memory is described in greater detail below in conjunction with FIG. 8.

If there is not a synchronization request (block 723), the application process is not yet finished with its critical section and the subsystem returns to block 701 to receive another read request or write request for access to a page. At block 703, the subsystem determines whether the page table entry for the page contains a present bit that is set to zero. For example, an application process may have previously made a write request to access a page and the subsystem may have already created a private page for the application process, mapped the page to the private page in the page table, and set the present bit in the page entry to non-zero. When the application process makes another write request to access the same page (block 701), the subsystem can detect that the present bit for the page entry is not zero (block 703). The subsystem will not invoke page exception handler, but allow the application process to access the private page that is currently mapped in the process page table (block 705) and to write to the private page. The application process can continue to have read access and write access to its private page until the application finishes working in its critical section and sends a request to synchronize the shared memory.

Figure 8:
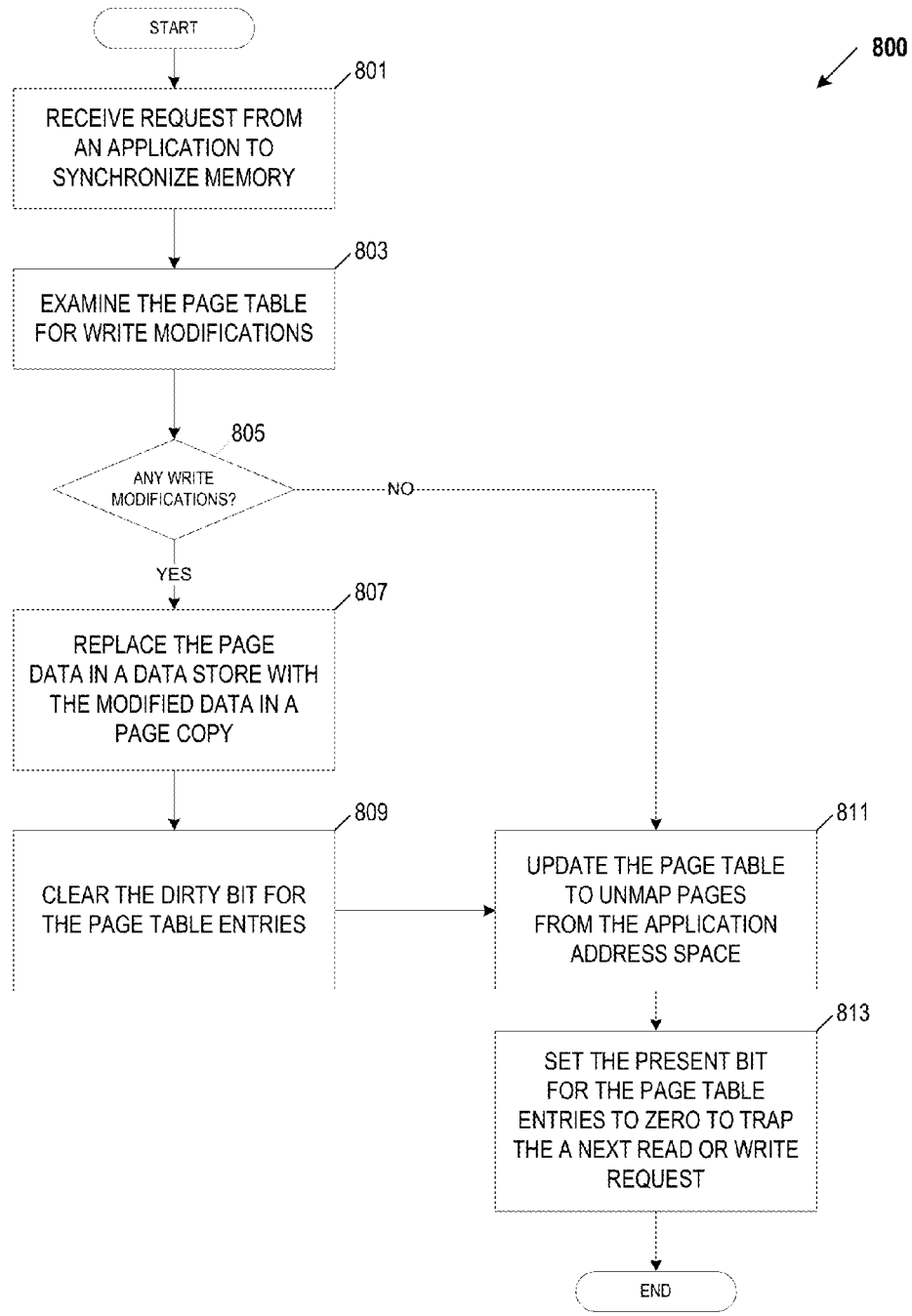
FIG. 8 is a flow diagram of an embodiment of a method for synchronizing modifications made to shared memory.

FIG. 8 is a flow diagram of an embodiment of a method 800 for synchronizing modifications made to shared memory. Method 800 can be performed by processing logic that can comprise hardware (e.g., circuitry, dedicated logic, programmable logic, microcode, etc.), software (e.g., instructions run on a processing device), or a combination thereof. In one embodiment, method 800 is performed by the memory management subsystem 140 in a computing system 100 of FIG. 1.

When an application process is finished accessing its critical section, it can make a synchronization system call, such as a msync system call, to request the operating system to synchronize the memory. By making a synchronization system call, the application process is requesting that the operating system update the mappings in the application's page table to allow the application access to any new data which other application processes may have committed to the underlying hardware and to share the data in the application's private pages with the other application processes. The memory management subsystem can transparently migrate page data that is in a private state to page data that is in a shared state.

In one embodiment, the method 800 starts with the subsystem receiving a synchronization request (e.g., a msync system call) from an application at block 801. At block 803, the subsystem examines the application's page table for any indication that the application process has made write modifications to page data. The subsystem can examine a flag in the page table entries, such as a dirty bit, to determine whether any page table entries are marked to indicate that the page data pertaining to the page table entry has been changed by the application.

If there are not any page table entries indicating that page data has been changed (block 805), the subsystem updates the page table at block 811. If there are page table entries that indicate that page data has changed (block 805), the subsystem transparently migrates the page data that has been changed in a private state to page data that is in a shared state. The subsystem replaces the page data in the underlying hardware (e.g., page data in a file stored in a file system on disk) with the modified page data that is contained in the page copy in the private state that resides in a page frame in physical memory at block 807. The changes made by an application process to it page copy in a private state is now committed to the underlying hardware in a shared state for other applications to access. For example, the subsystem detects that the dirty bit is set to one in a page table entry that maps a page to a page frame in physical memory containing page data in a private state. The subsystem writes the page data that is in the private state in the physical memory to the underlying hardware (e.g., disk) to replace the page data in the underlying hardware with the modified data in the physical memory (e.g., RAM). In one embodiment, at block 809, the subsystem clears the flag, such as the dirty bit, in the page table entries. In another embodiment, at block 811, the subsystem updates the application's page table to unmap the mappings in the page table entries. The subsystem unmaps the pages from the mappings in the process' page table. The subsystem unmaps the private pages provided during the critical section for the process' write requests from the process page table and unmaps any original page that were provided during the critical section for the process' read requests. The unmapping can remove the dirty bit from a page table entry.

At block 813, the subsystem sets the present bits for the page table entries to zero, such that, the next time the application process makes a read or write request for a page, the subsystem's page exception handler is invoked to map the page data in the underlying hardware, which is the most recently committed version of the page data, for a read request and/or to determine whether to create a copy of the page data in a private state for a write request.

Figure 9:
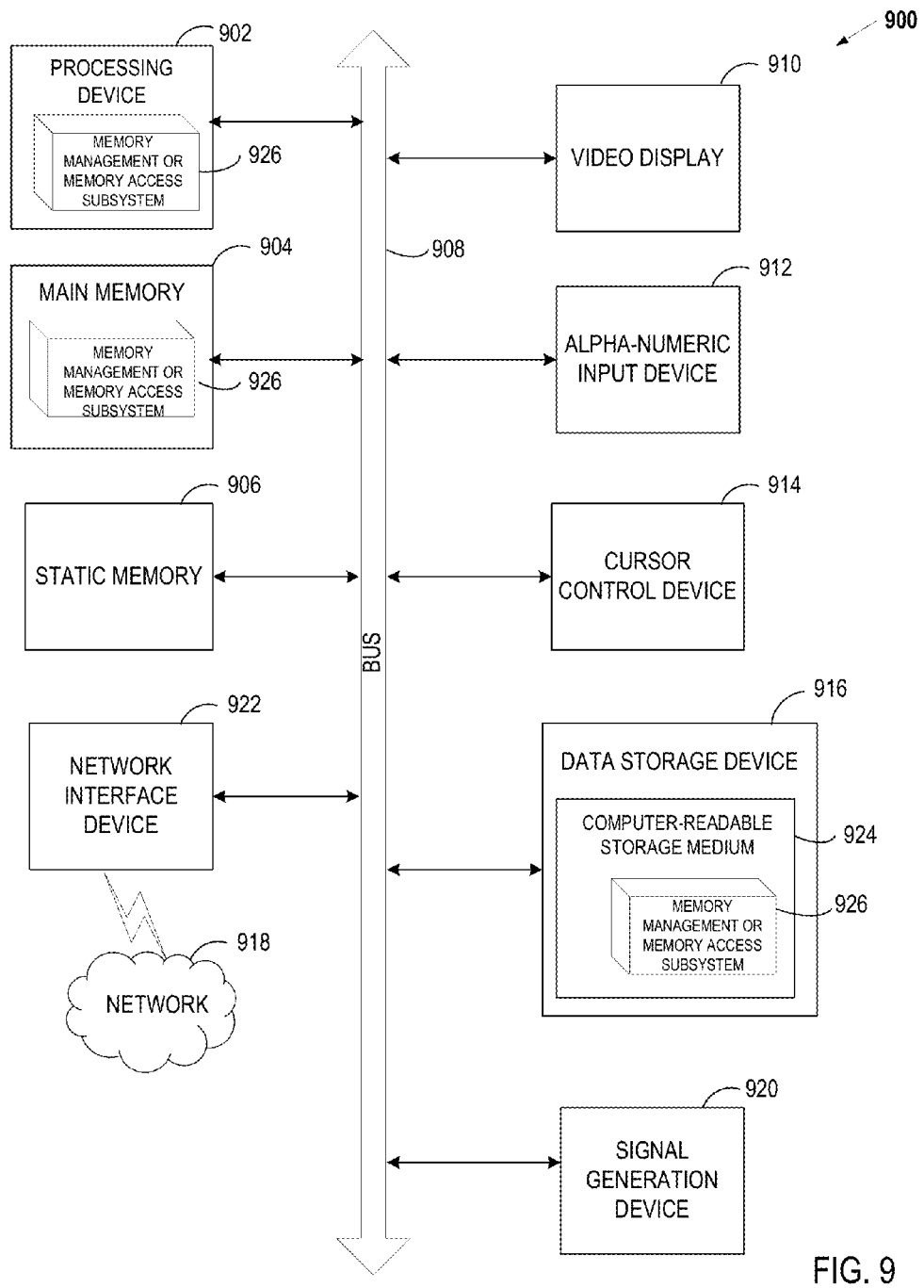
FIG. 9 is a diagram of one embodiment of a computer system for accessing shared memory.

FIG. 9 is a diagram of one embodiment of a computer system for accessing shared memory. Within the computer system 900 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a secondary memory 916 (e.g., a data storage device in the form of a drive unit, which may include fixed or removable computer-readable storage medium), which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the memory management subsystem or memory access subsystem 926 for performing the operations and steps discussed herein.

The computer system 900 may further include a network interface device 922. The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 920 (e.g., a speaker).

The secondary memory 916 may include a machine-readable storage medium (or more specifically a computer-readable storage medium) 924 on which is stored one or more sets of instructions (e.g., the memory management subsystem or memory access subsystem 926) embodying any one or more of the methodologies or functions described herein. The memory management subsystem or memory access subsystem 926 may also reside, completely or at least partially, within the main memory 904 and/or within the processing device 902 during execution thereof by the computer system 900, the main memory 904 and the processing device 902 also constituting machine-readable storage media. The memory management subsystem or memory access subsystem 926 may further be transmitted or received over a network 918 via the network interface device 922.

The computer-readable storage medium 924 may also be used to store the memory management subsystem or memory access subsystem 926 persistently. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The memory management subsystem or memory access subsystem 926, components and other features described herein (for example in relation to FIG. 1) can be implemented as discrete hardware components or integrated in the functionality of hardware components such as ASICS, FPGAs, DSPs or similar devices. In addition, the memory management subsystem or memory access subsystem 926 can be implemented as firmware or functional circuitry within hardware devices. Further, the memory management subsystem or memory access subsystem 926 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "configuring," "detecting," "creating," "replacing," "updating," "receiving," "setting," "sending," "modifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for configuring and managing access to shared memory. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
    detecting, by a processing device, a page fault in response to receiving a write request for original page data stored in a data store from a first application process of a plurality of application processes;
    creating, in physical memory, a copy of the original page data in response to detecting the page fault, wherein the first application process has modify access to the copy and wherein others of the plurality of application processes have read access to the original page data;

creating, in the data store, replaced page data by replacing the original page data with the copy in response to receiving a first synchronization request from the first application process; and updating a page table for a second application process of the plurality of application processes to configure access to the replaced page data in response to receiving a second synchronization request from the second application process.

2. The method of claim 1, wherein the first synchronization request and the second synchronization request are a msync system call.

3. The method of claim 1, wherein the plurality of application processes are processes for different applications.

4. The method of claim 1, further comprising:

receiving system calls from the plurality of application processes to map to the original page data stored in the data store;

setting a present bit in a page table entry that corresponds to the original page data to cause a page fault to occur when any one of the application processes makes a first request for the original page data; and setting a permission bit in the page table entry to cause the operating system to create a copy of the original page data in the physical memory when any one of the application processes makes a first write request for the original page data.

5. A system comprising:

a memory to store page tables for a plurality of application processes; and a processing device operatively coupled to the memory, the processing device to:

detect a page fault in response to receiving a write request from a first application process of the plurality of application processes;

create, in physical memory, a copy of the original page data in response to detecting the page fault, wherein the first application process has modify access to the copy and wherein others of the plurality of application processes have read access to the original page data;

create, in the data store, replaced page data by replacing the original page data with the copy in response to receiving a first synchronization request from the first application process; and update a page table for a second application process of the plurality of application processes to configure access to the replaced page data in response to receiving a second synchronization request from the second application process.

6. The system of claim 5, wherein the first synchronization request and the second synchronization request are a msync system call.

7. The system of claim 5, wherein the plurality of application processes are processes for different applications.

8. The system of claim 5, wherein the processing device is further to:

receive system calls from the plurality of application processes to map to the original page data stored in the data store;

set a present bit in a page table entry that corresponds to the original page data to cause a page fault to occur when any one of the application processes makes a first request for the original page data; and set a permission bit in the page table entry to cause the operating system to create a copy of the original page data in the physical memory when any one of the application processes makes a first write request for the original page data.

9. A non-transitory computer-readable storage medium including instructions that, when executed by a processing device, cause the processing device to perform operations comprising:

detecting, by the processing device, a page fault in response to receiving a write request for original page data stored in a data store from a first application process of a plurality of application processes;

creating, in physical memory, a copy of the original page data in response to detecting the page fault, wherein the first application process has modify access to the copy and wherein others of the plurality of application processes have read access to the original page data;

creating, in the data store, replaced page data by replacing the original page data with the copy in response to receiving a first synchronization request from the first application process; and updating a page table for a second application process of the plurality of application processes to configure access to the replaced page data in response to receiving a second synchronization request from the second application process.

10. The non-transitory computer-readable storage medium of 9, wherein the first synchronization request and the second synchronization request are a msync system call.

11. The non-transitory computer-readable storage medium of 9, wherein the plurality of application processes are processes for different applications.

* * * * *